uploads/10/138/2018/09/21.jpg

United States Patent
Wu et al.

(10) Patent No.: US 10,794,518 B2
(45) Date of Patent: Oct. 6, 2020

(54) PROFILE CLAMP HAVING SEALING ELEMENT

(71) Applicant: NORMA Germany GmbH, Maintal (DE)

(72) Inventors: Shuqian Wu, Jiachenghuayuan (CN); Detlef Henrich, Limeshain (DE); Tomas Coufal, Moravany (CZ); Michael Lenz, Schöneck (DE)

(73) Assignee: NORMA Germany GmbH, Maintal (DE)

( * ) Notice: Subject to any disclaimer, the term of this patent is extended or adjusted under 35 U.S.C. 154(b) by 0 days.

(21) Appl. No.: 16/138,201

(22) Filed: Sep. 21, 2018

(65) Prior Publication Data
US 2019/0093803 A1 Mar. 28, 2019

(30) Foreign Application Priority Data
Sep. 22, 2017 (DE) .................. 10 2017 121 994

(51) Int. Cl.
*F16L 23/08* (2006.01)
*F16L 23/04* (2006.01)
*F16L 23/18* (2006.01)

(52) U.S. Cl.
CPC ............... *F16L 23/04* (2013.01); *F16L 23/08* (2013.01); *F16L 23/18* (2013.01)

(58) Field of Classification Search
CPC . F16L 23/08; F16L 23/04; F16L 23/18; F16L 23/06
See application file for complete search history.

(56) References Cited

U.S. PATENT DOCUMENTS

| 2,377,510 | A | * | 6/1945 | Newell | F16L 17/04 |
| | | | | | 285/112 |
| 4,225,160 | A | * | 9/1980 | Ortloff | F16L 23/08 |
| | | | | | 285/123.2 |
| 5,782,499 | A | * | 7/1998 | Gfrerer | F16L 23/08 |
| | | | | | 285/23 |
| 6,062,610 | A | * | 5/2000 | Andersson | F16L 23/08 |
| | | | | | 285/367 |
| 7,393,020 | B2 | | 7/2008 | Hartig et al. | |

(Continued)

FOREIGN PATENT DOCUMENTS

CN 103069204 A 4/2013
CN 107166114 A 9/2017

(Continued)

OTHER PUBLICATIONS

German Office Action for German Patent Application No. 10 2017 121 994.3, dated Mar. 12, 2018, 5 pages.

(Continued)

*Primary Examiner* — David Bochna
(74) *Attorney, Agent, or Firm* — Reising Ethington, P.C.

(57) ABSTRACT

A profile clamp having a clamp band with two tensioning jaws which are connected to one another via a tensioning device. The clamp band has two band halves which are flexibly connected to one another via a connecting portion. An annular sealing element is arranged in the clamp band. The sealing element has an outer circumferential surface. The sealing element has at least one clip element. The at least one clip element encompasses the clamp band adjacent to the connecting portion.

15 Claims, 7 Drawing Sheets

(56) References Cited

U.S. PATENT DOCUMENTS

| | | | |
|---|---|---|---|
| 7,399,005 B2 | 7/2008 | Rigollet et al. | |
| 9,016,731 B2 | 4/2015 | Rigollet | |
| 9,568,130 B2 | 2/2017 | Henrich et al. | |
| 10,228,084 B2 | 3/2019 | Vosgeois et al. | |
| 2005/0017510 A1* | 1/2005 | Rigollet | F16L 23/08 285/367 |
| 2008/0185841 A1* | 8/2008 | Ignaczak | F16L 27/04 285/261 |
| 2008/0197627 A1* | 8/2008 | Baudoin | F16L 23/08 285/330 |
| 2013/0207389 A1 | 8/2013 | Rigollet | |
| 2015/0008663 A1* | 1/2015 | Drivon | F16L 23/08 285/45 |
| 2017/0254454 A1* | 9/2017 | Vosgeois | F16L 23/08 |
| 2017/0292643 A1* | 10/2017 | Prevot | F16L 23/08 |
| 2018/0094755 A1* | 4/2018 | Rigollet | F16L 23/20 |
| 2018/0259103 A1* | 9/2018 | Ignaczak | F16L 23/08 |

FOREIGN PATENT DOCUMENTS

| | | | | |
|---|---|---|---|---|
| DE | 102011116768 A1 | | 4/2013 | |
| DE | 102015109470 A1 | * | 12/2016 | F16L 23/08 |
| DE | 102017000798 A1 | * | 7/2017 | F16L 23/04 |
| DE | 102016103687 A1 | * | 9/2017 | F16L 23/08 |
| DE | 102016103687 A1 | | 9/2017 | |
| DE | 102017222383 A1 | * | 6/2019 | F16L 23/08 |
| EP | 1647754 A2 | | 4/2006 | |
| EP | 1647755 A1 | * | 4/2006 | F16L 23/08 |
| EP | 2474721 A1 | * | 7/2012 | F16L 23/08 |
| EP | 3460307 A1 | * | 3/2019 | F16L 23/04 |
| FR | 2833065 A1 | * | 6/2003 | F16L 23/08 |
| FR | 2867511 A1 | * | 9/2005 | F16L 23/04 |
| JP | 2005511991 A | | 4/2005 | |
| KR | 1020170104406 A | | 9/2017 | |
| WO | WO-2012013891 A1 | * | 2/2012 | F16L 23/08 |
| WO | WO2017148700 A1 | | 9/2017 | |
| WO | WO-2018140916 A1 | * | 8/2018 | F16L 23/08 |

OTHER PUBLICATIONS

First Korean Office Action for Korean Application No. 10-2018-0112285 dated Oct. 30, 2019 (10 pages).

English Translation of First Korean Office Action for Korean Application No. 10-2018-0112285 dated Oct. 30, 2019 (10 pages).

Chinese Office Action for Chinese Application No. 201811094586.7 dated Jan. 21, 2020 (7 pages).

English Translation of Chinese Office Action for Chinese Application No. 201811094586.7 dated Jan. 21, 2020 (6 pages).

First Japanese Office Action for Japanese Application No. 2018-168499 dated Sep. 24, 2019 (4 pages).

English Translation of First Japanese Office Action for Japanese Application No. 2018-168499 dated Sep. 24, 2019 (6 pages).

* cited by examiner

PROFILE CLAMP HAVING SEALING ELEMENT

CROSS-REFERENCE TO RELATED APPLICATION

This application claims the benefit of German Patent Application No. 10 2017 121 994.3, filed Sep. 22, 2017.

INTRODUCTION

The present disclosure relates to a profile clamp having a clamp band which has a tensioning head having two tensioning jaws, wherein an annular sealing element is arranged in the clamp band, which sealing element has positioning lugs on an inner edge, wherein the sealing element has at least one projection on an outer edge, which projection is arranged in the region of a recess in the clamp band.

The terms "pipe" and "hose" or "pipe end" and "hose end" are used equivalently below Profile clamps are provided for example for the fluid-tight connection of two axially adjoining pipe or hose ends, which conventionally have radially outwardly directed connecting flanges. The profile clamp is then seated on the corresponding flange, wherein radial and axial holding forces are introduced by tensioning the profile clamp. To this end, the clamp band generally has a V- or U-shaped cross-section.

To achieve a fluid-tight connection, a sealing element is frequently used, which is positioned axially between the connecting flanges of the pipe ends. In this case, at least two independent components generally have to be used and handled, namely the profile clamp on the one hand and the sealing element on the other. This results in the installation of the profile clamp being relatively complex. An assembly fitter then has to position the sealing element and the profile clamp correctly with respect to the pipe at the same time.

U.S. Pat. No. 9,016,731 B2, for example, discloses a profile clamp for connecting pipes or hoses, which has an annular sealing element whereof the radially inner edge has at least one positioning lug and whereof the radially outer edge has at least one projection. This design enables an initial pre-positioning with respect to a hose or pipe end during the pre-assembly.

A similar clamp is described in DE 10 2011116 768 A1. In this, a profile clamp having a tensioning element and a sealing element is disclosed, wherein the sealing element has elastically deformable spacers arranged on a radial outer side. The clamp moreover has a clamp band in which the sealing element lies. In this case, the elastically deformable spacers of the sealing element can abut against an inner side of the clamp band.

SUMMARY

The disclosure provides a profile clamp having a sealing element, which can be produced with little effort and yet still ensures simple and reliable fixing of the sealing element on the profile band. The connection of pipe ends with the aid of the profile clamp should moreover be possible with little effort.

In a profile clamp having a clamp band, which has a tensioning device having two tensioning jaws, wherein the clamp band has two band halves which are flexibly connected to one another via a connecting portion and wherein an annular sealing element is arranged in the clamp band, which sealing element has an outer circumferential surface, it is provided according to an embodiment that the sealing element has at least one clip element, wherein the at least one clip element encompasses the clamp band adjacent to the connecting portion. This embodiment enables a captive fixing of the sealing element on the clamp band. During the tensioning of the profile clamp, although the diameter of the profile clamp becomes smaller, the position of the connecting portion with respect to the pipe ends remains unaltered. Accordingly, the sealing element which is fixed relative to the connecting portion can also maintain its position during the tensioning procedure and the clip element can also be constructed relatively simply. In this case, the use of the clip element has the consequence and an advantage, in an embodiment, that no tools are required to introduce the sealing element into the profile clamp. It is therefore also possible to dispense with a special tool for pre-assembling the profile clamp on a pipe flange. The flexible connecting portion can moreover be formed as a material-fitting joint or comprise an additional element which connects the band halves flexibly to one another. The clip element can furthermore be formed in one piece with the sealing element.

An advantageous further development, in an embodiment, provides that the circumferential surface of the sealing element has a radially inner edge and a radially outer edge, wherein the circumferential surface between the radially inner edge and the radially outer edge is formed substantially at an angle to the axial direction. A sealing element formed in this way can be introduced more easily and with less effort into the opening of one of the pipe ends to be connected. Moreover, the sealing element which is at an angle to the axial direction can be plastically deformed between the outer wall of the one pipe end and the inner wall of the other pipe end in each case during the tensioning of the profile clamp, whereby the sealing at the connecting point of the two pipes is improved. It can furthermore be provided that the circumferential surface has a bead, whereby its stability is increased. Moreover, the sealing capacity of the sealing element can be improved via the bead.

An embodiment provides at least one lug on the radially inner edge of the circumferential surface, which lug extends substantially in the axial direction. The lug enables the sealing element and therefore the profile clamp to be positioned or centred relative to one of the pipe ends. Connection of the two pipe ends is therefore simplified. In this case, it can be envisaged for example that the profile clamp together with its sealing element is pre-fastened on a pipe end. The at least one lug of the sealing element then serves as a type of guide, with the aid of which the sealing element and therefore the profile clamp can be positioned centrically on the pipe end. After assembly of the other pipe, the at least one lug moreover prevents the sealing element, and therefore the profile clamp itself, from twisting during the tensioning of the profile clamp. The at least one lug can moreover be formed in two parts and be angled with respect to the centre point of the sealing element. It is furthermore possible that the lug can be in the shape of a spike, for example. Lugs of this type reinforce the connection between the pipe ends. If the sealing element is namely clamped between the two pipe ends as a result of tensioning the profile clamp, it can be elastically deformed in such a way that the lugs are pressed against the inner wall of one of the pipe ends. As a result, additional fixing of the sealing element is produced in the region between the two pipes, in particular in the case of spike-like lugs. This results in an altogether greater stability and leak-tightness of the connection. The at least one lug can furthermore be formed in one piece with the sealing element.

A variant of the disclosure provides that the at least one lug is bent in the shape of a step. In this case, the at least one lug is bent in the radial direction according to a particular variant. The form of the at least one lug, which is bent in the shape of a step, in an embodiment results in the advantage that the sealing element has an increased holding force when it is fastened on a pipe end. During the assembly of two pipe ends, the at least one lug is moreover positioned between the two flanges of the pipe ends. If the lug now has a form which is bent in the shape of a step, it is pressed flat during the connection of the two pipe ends. This produces an additional holding force, whereby a twisting of the sealing element and therefore the profile clamp is prevented. A profile clamp having a lug which is bent in the shape of a step therefore no longer has to be held manually, for example, to prevent twisting during the tensioning procedure.

In an embodiment, it can moreover be advantageous if the clip element is mounted on the radially outer edge of the circumferential surface, wherein it is bent back at least partially over the circumferential surface of the sealing element. A clip element which is designed in this way can hold the sealing element reliably on the clamp band. The clip element is able to encompass the clamp band in an improved manner as a result of being initially partially bent back over the circumferential surface. In this case, encompassing constitutes clamping or gripping, for example.

In an embodiment, it is structurally favourable that the sealing element has at least one fixing device protruding radially and axially outwards on the radially outer edge. The fixing device(s) can be formed in particular in one piece with the sealing element and assist with the pre-fixing of the sealing element by the clip element in an advantageous manner in that they likewise encompass the clamp band. This counteracts a slipping or shaking of the sealing element relative to the clamp. In this case, the fixing devices are either sufficiently elastically deformable to enable a tensioning of the profile clamp or they become free from the clamp band during the tensioning of the profile clamp.

In an embodiment, an advantage results from the least one fixing device forming a first fixing portion and a second fixing portion. The design of the at least one fixing device in two portions may be beneficial because the fixing device can thus assist with fixing the sealing element on the clamp band on the one hand, and assume an assisting clamping function during the connection of a respective pipe end to the profile clamp on the other.

In this case, it is provided that the sealing element is held on the profile clamp by the fixing device, wherein the first fixing portion encompasses the clamp band with form fit. To this end, the first fixing portion of the fixing device can be designed in such a way that its form corresponds substantially to the form of the circumferential surface of the clamp band. The first fixing portion can thereby encompass the clamp band with form fit and virtually completely. This results in increased stability of the connection between the sealing element and the clamp band.

In an embodiment, the sealing element is held on the profile clamp by the fixing device, wherein the first fixing portion encompasses a screw element of the tensioning device with form fit. In this case, the first fixing portion of the fixing device is designed in such a way that its form corresponds substantially to the circumference of the bolt or pin of the screw element of the tensioning device. In general, this therefore means that such a first fixing portion has a hook shape. The hook-shaped first fixing portion can therefore encompass the screw element of the tensioning device with form fit in the region of the threaded bolt. To increase the flexibility of the fixing device and therefore to compensate a reduction in diameter of the profile clamp which occurs during the tensioning of the profile clamp, the fixing device can point away from the circumferential surface of the sealing element in the axial direction in the region of its second portion. This achieves a spring effect, which results in the fixing device, which is hooked on the screw element under tension, drawing the sealing element and the screw element towards one another with a certain spring force. The stability of the connection between the sealing element and the clamp may therefore be altogether improved.

According to an embodiment, it is moreover provided that the sealing element is pre-positioned on a pipe end by the second fixing portion. To this end, the second fixing portion can be designed for example in such a way that the pipe end is clamped between the second fixing portion and the outer circumferential surface of the sealing element. In this case, the clamping effect, by means of which the profile clamp is pre-fastened on the hose or pipe end and which is already produced by the cooperation between the clamp band and the sealing element, can be assisted in a positive manner by the second fixing portion.

In an embodiment, it is moreover structurally favourable that the connecting portion of the clamp band is arranged diametrically opposite the tensioning device. A simple widening or tensioning of the profile clamp and a uniform force flow are thus achieved.

BRIEF DESCRIPTION OF THE DRAWINGS

Further features, details and advantages of the disclosure are revealed in the wording of the claims and in the following description of exemplary embodiments with the aid of the drawings, which show:

DETAILED DESCRIPTION

Figure 1:
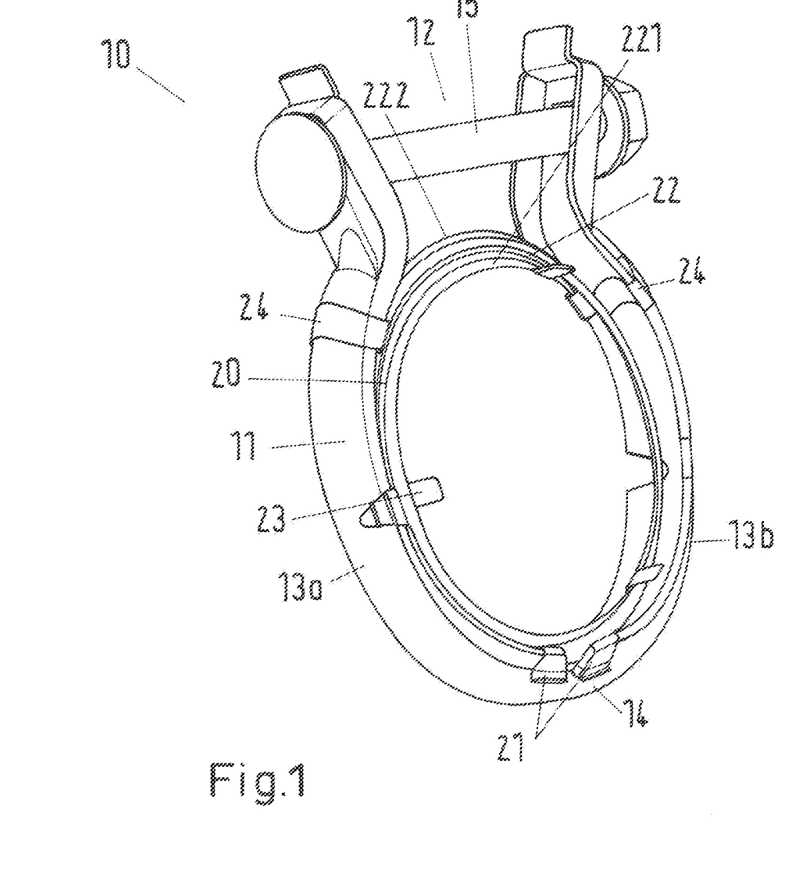
FIG. 1 a profile clamp having a first embodiment of a sealing element.

FIG. 1 shows, in a perspective illustration, an embodiment of a profile clamp 10 having an annular sealing element 20. The profile clamp has a clamp band 11, which is constructed from two band halves 13*a*, 13*b*. The band halves 13*a*, 13*b* are connected to one another via a connecting portion 14. In this case, the connecting portion 14 can be designed in the form of a recess in flanks of the clamp band 11, as in FIG. 1. The recess results in the clamp band being more flexible in the region of the connecting portion 14 than in the region of the band halves 13*a*, 13*b*. The clamp band 11 in FIG. 1 moreover has a respective further recess in the flanks on each band half 13*a*, 13*b*, which likewise bring about an improved flexibility of the clamp band 11.

The clamp band 11 furthermore has a tensioning device 12, which is arranged diametrically opposite the connecting portion 14. The tensioning device 12 according to FIG. 1 comprises two tensioning jaws, which are each formed at ends of the two band halves 13a, 13b of the clamp band 11 which are remote from the connecting portion and are connected to one another via a screw element 15. By tensioning the tensioning device 12, the tensioning jaws and therefore the band halves 13a, 13b are moved towards one another, whereby the internal diameter of the profile clamp 10 becomes smaller and a tensioning force is introduced.

The sealing element 20 shown in FIG. 1 should be designed to be as tight and, at the same time, flexible as possible and could be produced for example from a metal material such as sheet metal or the like. The sealing element 20 has a circumferential surface 22 which is formed substantially at an angle to the axial direction between an inner edge 221 and its radially outer edge 222. The sealing element 21 is therefore already adapted to the generally angled flange at the pipe ends 30a, 30b. Moreover, the sealing element 20 which is at an angle to the axial direction can be deformed between the outer wall of the one pipe end 30 and the inner wall of the other pipe end 30 during the tensioning of the profile clamp 10, whereby the sealing capacity of the profile clamp at the connecting point of the two pipes is improved.

The sealing element 20 is held in the clamp band 11 of the profile clamp 10 in such a way that the clamp band 11 surrounds the sealing element 20. Meanwhile, the external diameter of the annular sealing element 20 is greater than the internal diameter of the clamp band 11 at its narrowest point. So that the sealing element 20 can be held in the clamp band 11, the sealing element 20 in the case of the profile clamp 10 shown in FIG. 1 has two clip elements 21 on its radially outer edge 222, wherein the sealing element 20 is clamped on the clamp band 11 via the clip elements 21. In the embodiment according to FIG. 1, it is provided that the clip elements 21 encompass the clamp band 11 adjacent to the connecting portion 14, wherein the connecting portion 14 in the case shown lies directly between the two clip elements 21; the clip elements 21 therefore embrace the clamp band 11 to the left and right of the connecting portion 14 in each case.

The sealing element 20 shown in FIG. 1 moreover has three lugs 23 on its radially inner edge 221, which extend substantially in the axial direction. In this case, the lugs 23 are formed on the same axial side of the sealing element 20 as the clip elements 21. The three lugs 23 are moreover approximately evenly spaced from one another in the circumferential direction. The lugs 23 facilitate the seating of the sealing element 20 and therefore the profile clamp 10 on a pipe end 30 in that they can be introduced into the pipe end 30, whereby the pipe end 30 and the profile clamp 10 can in turn be centred relative to one another.

FIG. 1 moreover shows two fixing devices 24 which are formed on the radially outer edge 222 of the sealing element 20 and position the sealing element 20 together with the clip elements 21 on the clamp band 11. In this case, the fixing devices 24 encompass the clamp band 11 to the left and right of the tensioning device 12 in each case in the circumferential direction.

Figure 2:
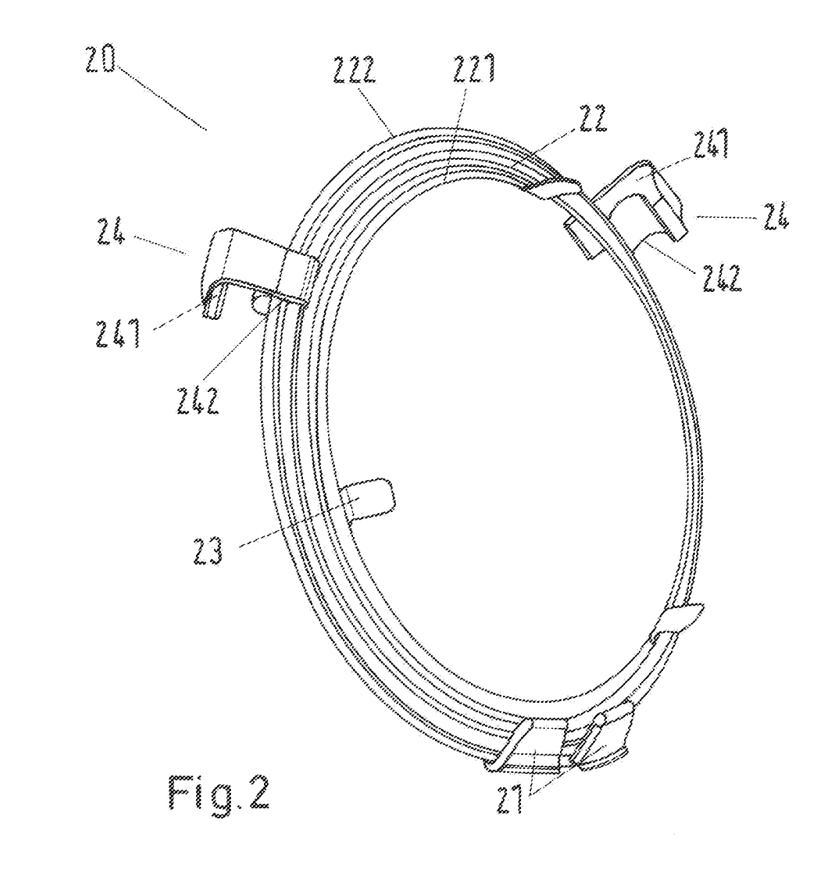
FIG. 2 a first embodiment of a sealing element without the profile clamp.

In FIG. 2, a perspective illustration of the sealing element 20 of FIG. 1 is shown without the profile clamp 10. The description of the sealing element 20 of FIG. 1 also applies to the sealing element 20 shown in FIG. 2. However, the fixing devices 24 of the sealing element are fully visible in FIG. 2 owing to the missing profile clamp 10. Both fixing devices 24 of the sealing element 20 are divided into a first fixing portion 241 and a second fixing portion 242 in the example shown in FIG. 2, wherein the first fixing portion 241 encompasses the clamp band 10. To this end, the form of the first fixing portion 241 corresponds substantially to the cross-section of the clamp band 11. It is thus ensured that the first fixing portion 241 can abut with its inner side against the outer side of the clamp band 11 with form fit. The second fixing portion 242 of a fixing device 24 is designed in such a way that it can engage in a pipe end 30a, 30b. The sealing element 20 and therefore the profile clamp 10 are thus pre-fixed on one of the pipe ends 30a, 30b. The opening of the second fixing portion 242 moreover points substantially in the same axial direction in which the lugs 23 are also formed. The fixing devices 24 illustrated in FIGS. 1 and 2 fulfil a dual function: they act as additional fastening devices of the sealing element 20 on the clamp band 11 and assist with the connection of the two pipe ends 30a, 30b to one another by improving the pre-fixing of the profile clamp 10 on each of the pipe ends 30a, 30b.

Figure 3:
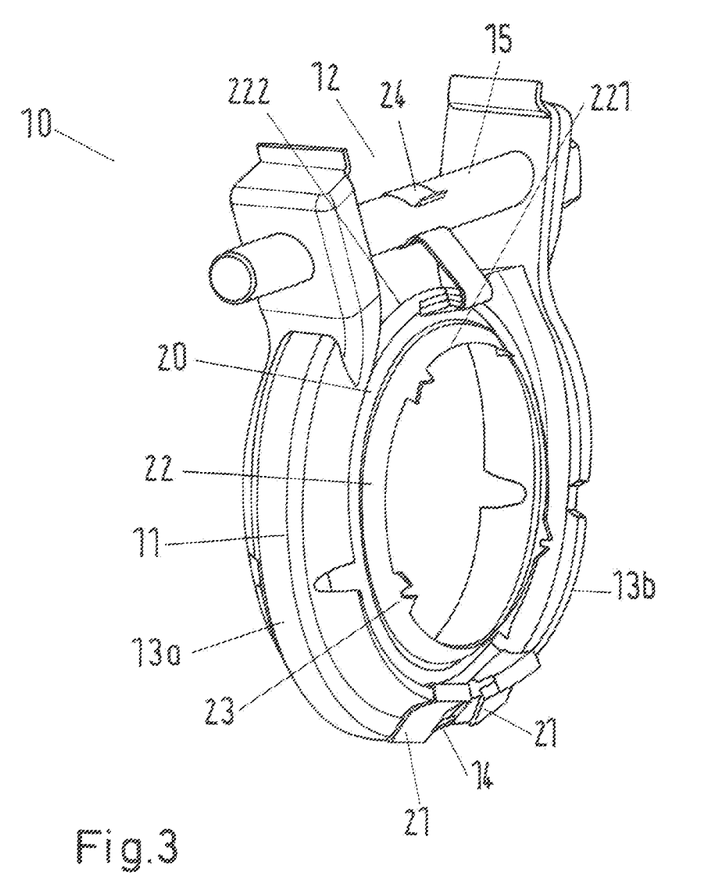
FIG. 3 a profile clamp having an alternative embodiment of a sealing element.
Figure 4:
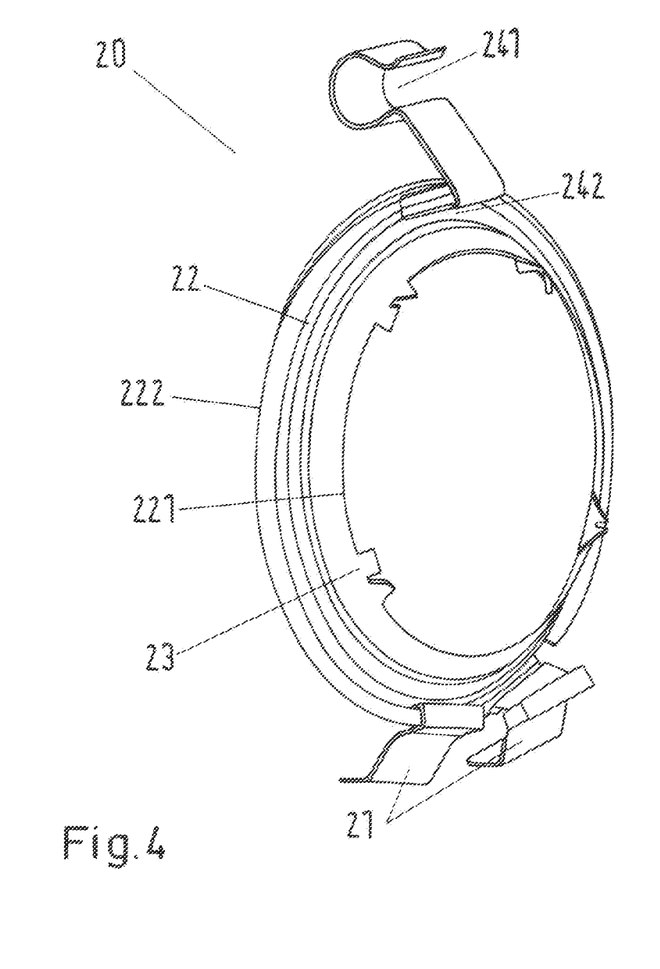
FIG. 4 an alternative embodiment of a sealing element without the profile clamp.

FIGS. 3 and 4 show a sealing element 20 in an alternative embodiment, wherein the sealing element 20 in FIG. 3 is held in a profile clamp. The sealing element 20 shown in FIGS. 3 and 4 differs from a sealing element 20 according to the embodiment described in FIGS. 1 and 2 especially in that, in the case of the sealing element 20 in FIGS. 3 and 4, only a single fixing device 24 is provided. In this case, the fixing device 24 is arranged on the radially outer edge 222 of the sealing element 20 and substantially diametrically opposite the clip elements 21. The first fixing portion 241 of the fixing device 24 is furthermore formed in the shape of a hook.

The sealing element 20 is arranged in the profile clamp 10 in FIG. 3. In this case, the sealing element 20 is pre-assembled on the profile clamp 10 via its clip elements 21 on the one hand and via its fixing device 24 on the other. To this end, it is provided that the fixing device 24 is clamped or hooked onto the screw element 15 of the tensioning device 12 via its first fixing portion 241, wherein the first fixing portion 241 encompasses the screw element 15 at least partially with form fit.

The sealing element 20 has, on its radially inner edge 221, lugs 23 which point substantially in an axial direction. The lugs 23 shown in FIGS. 3 and 4 are somewhat shorter than the lugs 23 known from FIGS. 1 and 2. The lugs 23 in FIGS. 3 and 4 are moreover designed in two parts and in the shape of a spike. Lugs 23 of this type reinforce the connection between the pipe ends 30a, 30b. If the sealing element 20 is namely clamped between the two pipe ends 30a, 30b as a result of tensioning the profile clamp 10, it can be deformed during this in such a way that the lugs 23 are pressed against the inner wall of one of the pipe ends 30a, 30b. As a result, in particular owing to the spike-shaped lugs 23, additional fixing of the sealing element 20 is produced in the region between the two pipes, whereby an altogether greater stability and leak-tightness is achieved.

Figure 5:
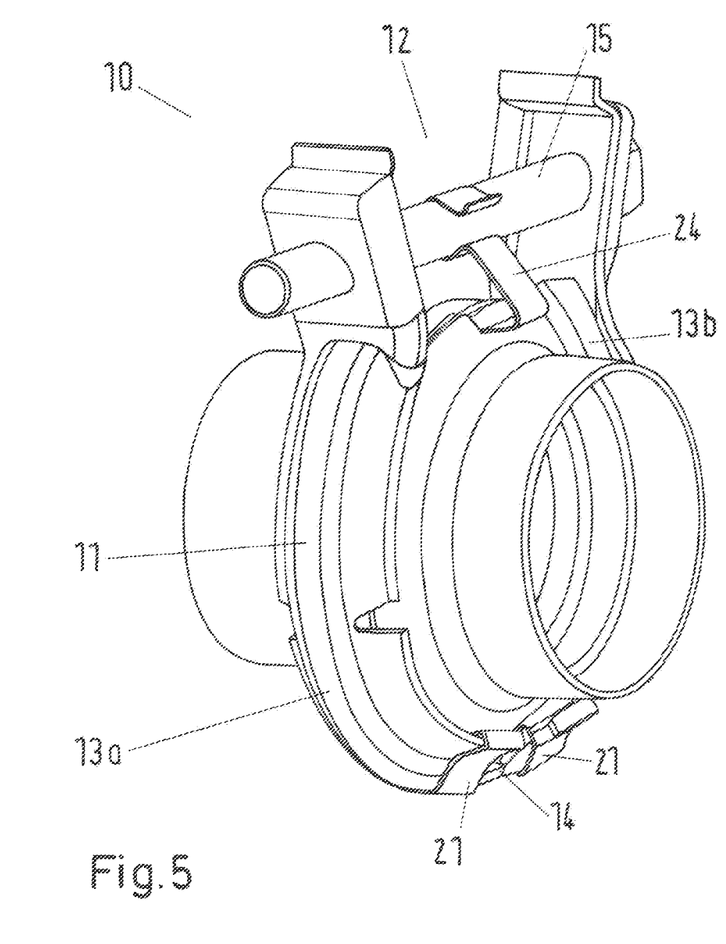
FIG. 5 a profile clamp having a sealing element which connects two pipes.

FIG. 5 shows, in a perspective illustration, a profile clamp 10 having a sealing element 20, which connects two pipe ends 30a, 30b via their flanges. In this case, the sealing element 20 is substantially identical to the variant shown in FIGS. 3 and 4 and is not described again at this point. FIG. 5 moreover shows how one of the pipe ends 30a, 30b is received in the second fixing portion 242 of the fixing device 24, whereby a pre-fixing of the profile clamp 10 on this pipe end 30a, 30b is enabled. In this case, the second fixing portion 242 is formed from the circumferential surface 22 of the sealing element 20 and the web of the fixing device 24, which points in the axial direction from the radially outer edge 222 of the sealing element 20. The pipe end 30a, 30b is clamped in this second fixing portion 242 for improved pre-fixing of the sealing element 20 or the profile clamp 10.

Figure 6:
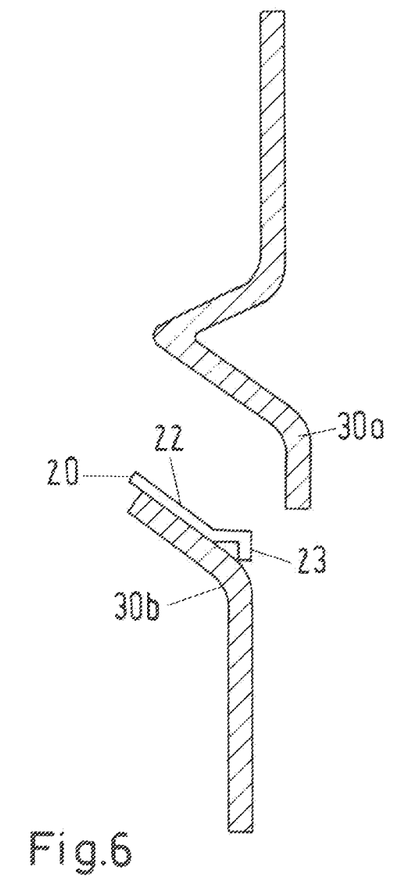
FIG. 6 a longitudinal section through a sealing element having a first embodiment of a lug.

FIG. 6 shows a longitudinal section through a sealing element 20 having a first embodiment of a lug 23. Two pipe ends 30a, 30b to be connected are moreover depicted, wherein, in the case of the example shown in FIG. 6, the external diameter of the one pipe end 30a at its narrowest point corresponds substantially to an internal diameter of the other pipe end 30b at its narrowest point. There is therefore only a slight tolerance between the diameters of the two pipe ends 30a, b. Therefore, during the connection of the pipe ends 30a, b, there is also only a small amount of available space in which parts of the sealing element 20, for example the at least one lug 23, could be arranged. In such a case, it is therefore advantageous, in this embodiment, if the sealing element 20 is designed in such a way that its circumferential surface 22 does not project over the flange of that pipe end 30b on which the sealing element 20 is fastened. If the circumferential surface 22 were to project over the flange, it would be an obstacle to a precisely fitting connection of the pipe ends 30a, 30b. The fact that the circumferential surface 22 of the sealing element 20 does not project over the flange of the pipe end 30b in turn results in the at least one lug 23 of the sealing element 20 also being formed in the region of the flange. Since the at least one lug 23 projects in the direction of the flange, the circumferential surface 22 of the sealing element 20 is deformed away from the flange by a spring force. The at least one lug 23 is pressed against the flange by a corresponding tensioning force. The hold of the sealing element 20 on the pipe end 30b is thereby reinforced.

When connecting the pipe ends 30a, 30b, the circumferential surface 22 of the sealing element 20 together with the at least one lug 23 is now clamped and pressed flat between the flanges of the two pipe ends 30a, 30b. This ensures an increase in the holding force of the sealing element 20 during the tensioning of the profile clamp 10, which counteracts a twisting of the sealing element 20 and therefore the profile clamp 10 during the tensioning procedure.

Figure 7:
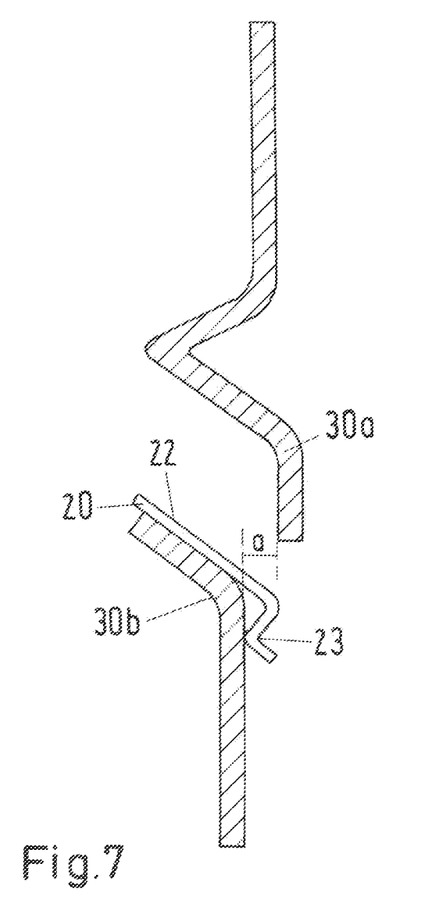
FIG. 7 a longitudinal section through a sealing element having an alternative embodiment of the lug.

FIG. 7 shows the longitudinal section of a sealing element 20 having an alternative embodiment of a lug 23. As in FIG. 6, two pipe ends 30a, 30b to be connected are moreover shown. In the example illustrated in FIG. 7, the external diameter of the one pipe end 30 at its narrowest point is smaller by a distance (a) than the internal diameter of the other pipe end 30b at its narrowest point—a play therefore exists between the diameters of the pipe ends 30a, 30b. In the example shown in FIG. 7, the circumferential surface 22 of the sealing element 20 projects over the flange of that pipe end 30b on which the sealing element 20 is fastened. In this case the circumferential surface 22 projects over the flange in such a way that the at least one lug 23 projects into the interior of the pipe end 30b, wherein the at least one lug 23 presses against the inner wall of the pipe end 30b under a tensioning force. The tensioning force is additionally increased as a result of the at least one lug 23 shown in FIG. 7 being bent in the shape of a step. The sealing element 20 is therefore positioned centrically on the pipe end 30b in such a way that a twisting of the sealing element 20 and therefore the profile clamp 10 during the assembly of the pipe ends 30a, 30b is substantially prevented.

Since, as shown in FIG. 7, the diameters of the pipe ends 30a, 30b differ by the distance (a), a space remains between them, in which the at least one lug 23 is arranged. The at least one lug 23 is thus preferably clamped between the two pipe ends 30a, 30b. The lug 23, which is bent in the shape of a step in the non-clamped state, is pressed flat as a result of the clamping, whereby the holding force of the clip element 20 during the assembly of the pipe ends 30a, 30b is increased. A twisting of the clip element 20 is prevented as a result of the increased holding force. This has the advantageous effect, in this embodiment, that the profile clamp 10 also remains in position to the greatest extent possible during the tensioning procedure and does not twist.

The invention is not restricted to one of the embodiments described above, but may be modified in various ways.

All of the features and advantages revealed in the claims, the description and the drawing, including structural details, spatial arrangements and method steps, can be essential to the invention both in themselves and also in a wide variety of combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE SIGNS

10 Profile clamp
11 Clamp band
12 Tensioning device
13a,b Band halves
14 Connecting portion
15 Screw element
20 Sealing element
21 Clip element
22 Circumferential surface
221 Radially inner edge
222 Radially outer edge
23 Lug
24 Fixing device
241 First fixing portion
242 Second fixing portion
30a,b Pipe ends
a Spacing

The invention claimed is:

1. Profile clamp comprising a clamp band having two tensioning jaws which are connected to one another via a tensioning device, wherein the clamp band has two band halves which are flexibly connected to one another via a connecting portion, and wherein an annular sealing element is arranged in the clamp band, which sealing element has an outer circumferential surface, wherein the sealing element has at least one clip element, wherein the at least one clip element encompasses the clamp band adjacent to the connecting portion, wherein at least one lug is provided on a radially inner edge, which at least one lug extends substantially in an axial direction.

2. Profile clamp according to claim 1, wherein the circumferential surface of the sealing element has a radially inner edge and a radially outer edge, wherein the circumferential surface between the radially inner edge and the radially outer edge is formed at an angle to the axial direction.

3. Profile clamp according to claim 2, wherein the clip element proceeds from the radially outer edge of the circumferential surface, wherein it is bent back at least partially over the circumferential surface of the sealing element.

4. Profile clamp according to claim 2, wherein the sealing element has at least one fixing device protruding radially and axially outwards on the radially outer edge.

5. Profile clamp according to claim 4, wherein the at least one fixing device forms a first fixing portion and a second fixing portion.

6. Profile clamp according to claim 5, wherein the sealing element is fixed on the profile clamp by the fixing device, wherein the first fixing portion encompasses the clamp band.

7. Profile clamp according to claim 6, wherein the sealing element is fixed on the profile clamp by the fixing device, wherein the first fixing portion encompasses a screw element of the tensioning device with form fit.

8. Profile clamp according to claim 1, wherein the at least one lug is bent in the shape of a step.

9. Profile clamp according to claim 1, wherein the connecting portion of the clamp band is arranged diametrically opposite the tensioning device.

10. Profile clamp according to claim 1, wherein the at least one clip element comprises a first clip element that encompasses a first one of the two band halves of the clamp band adjacent to the connecting portion.

11. Profile clamp according to claim 10, wherein the at least one clip element further comprises a second clip element that encompasses a second one of the two band halves of the clamp band adjacent to the connecting portion.

12. Profile clamp according to claim 11, wherein the connecting portion lies between the first clip element and the second clip element.

13. Profile clamp according to claim 1, wherein the connecting portion is integrally formed with the two band halves of the clamp band.

14. Profile clamp comprising a clamp band having two tensioning jaws which are connected to one another via a tensioning device, wherein the clamp band has two band halves which are flexibly connected to one another via a connecting portion, and wherein an annular sealing element is arranged in the clamp band, which sealing element has an outer circumferential surface, wherein the sealing element has at least one clip element, wherein the at least one clip element encompasses the clamp band adjacent to the connecting portion, wherein at least one lug is provided on a radially inner edge, which at least one lug extends substantially in an axial direction, wherein the at least one lug is bent in the shape of a step.

15. Profile clamp comprising a clamp band having two tensioning jaws which are connected to one another via a tensioning device, wherein the clamp band has two band halves which are flexibly connected to one another via a connecting portion, and wherein an annular sealing element is arranged in the clamp band, which sealing element has an outer circumferential surface, wherein the sealing element has at least one clip element, wherein the at least one clip element encompasses the clamp band adjacent to the connecting portion, wherein the circumferential surface of the sealing element has a radially inner edge and a radially outer edge, wherein the circumferential surface between the radially inner edge and the radially outer edge is formed at an angle to the axial direction, wherein the sealing element has at least one fixing device protruding radially and axially outwards on the radially outer edge, wherein the at least one fixing device forms a first fixing portion and a second fixing portion, wherein the sealing element is fixed on the profile clamp by the fixing device, wherein the first fixing portion encompasses the clamp band, and wherein the sealing element is fixed on the profile clamp by the fixing device, wherein the first fixing portion encompasses a screw element of the tensioning device with form fit.

* * * * *